United States Patent [19]

Kulik et al.

[11] 4,163,776

[45] Aug. 7, 1979

[54] PROCESS FOR STACK GAS DESULFURIZATION

[75] Inventors: Metro D. Kulik, Pittsburgh, Pa.; Everett Gorin, San Rafael, Calif.

[73] Assignee: Continental Oil Company, Stamford, Conn.

[21] Appl. No.: 966,687

[22] Filed: Dec. 5, 1978

[51] Int. Cl.$^2$ .............................................. C01B 17/04
[52] U.S. Cl. ..................................... 423/567; 423/242
[58] Field of Search ....................... 423/242, 561, 571

[56] References Cited

U.S. PATENT DOCUMENTS

| | | | |
|---|---|---|---|
| 1,102,911 | 7/1914 | Hansen | 423/567 |
| 3,645,671 | 2/1972 | Griffin et al. | 423/242 |
| 3,764,653 | 10/1973 | Urban | 423/242 |
| 3,906,080 | 9/1975 | Gorin et al. | 423/242 |
| 3,937,787 | 2/1976 | Gorin et al. | 423/242 |
| 4,008,310 | 2/1977 | Gorin | 423/242 |

*Primary Examiner*—G. O. Peters
*Attorney, Agent, or Firm*—F. Lindsey Scott; William A. Mikesell, Jr.

[57] ABSTRACT

A method for desulfurizing a gaseous mixture such as flue gas by sequentially contacting the gaseous mixture with an aqueous solution containing ammonium thiosulfate in a first zone; an aqueous solution containing ammonia and ammonium thiosulfate in a second zone; and an aqueous solution containing ammonium thionate or thionic acid in a third zone. The sulfur is optionally recovered as elemental sulfur.

8 Claims, 1 Drawing Figure

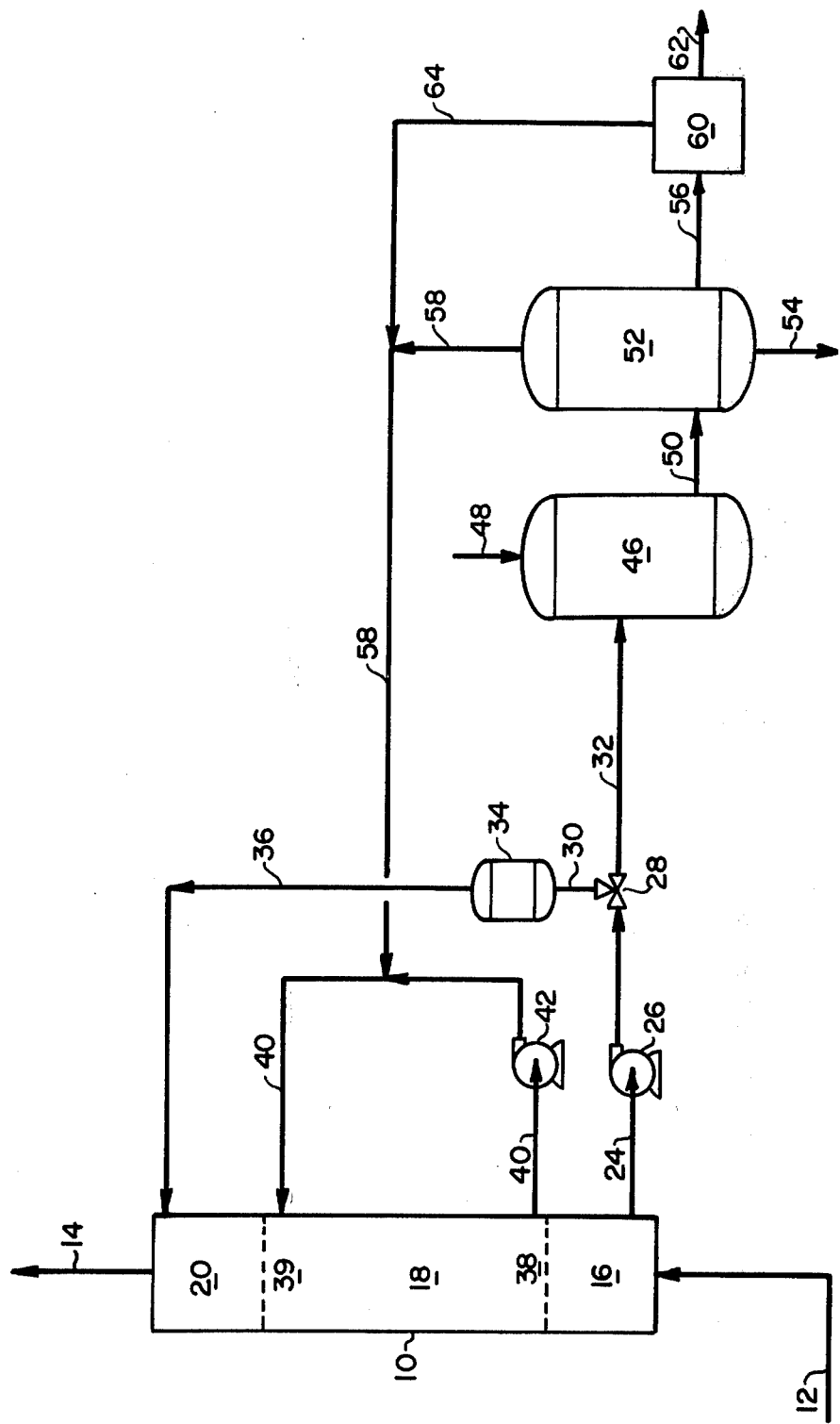

PROCESS FOR STACK GAS DESULFURIZATION

This invention relates to methods for removing sulfur from gaseous streams.

This invention also relates to the removal of sulfur from gaseous streams by regenerable processes whereby the absorbents used are regenerated for subsequent recycling to the sulfur absorption zone.

This invention also relates to the use of ammonia salts in the absorption of sulfur oxides from gaseous mixtures.

This invention further relates to the use of thionic acids for the prevention of ammonia loss in a gas scrubbing process in which ammonium hydroxide or ammonium salts are employed for the absorption of sulfur oxides.

In recent years, increasing interest has been directed to the removal of sulfur oxides from gaseous streams emitted from furnaces, boilers and the like wherein carbonaceous fuels containing sulfur compounds are combusted. The increase in industrial activity in recent years has resulted in an increased awareness of the undesirable effects of sulfur oxides in the atmosphere and as a result, a continuing effort has been directed to the development of improved processes for the removal of such sulfur oxides from stack gases.

One commonly used technique is that of scrubbing the sulfur oxides from such gaseous mixtures and a variety of scrubbing techniques have been proposed. For example, aqueous slurries of calcium carbonate have been used to absorb sulfur oxides from such gaseous mixtures. The calcium sulfoxy compounds so produced have been used in the main as a sludge or the like and are not usually regenerated for recycle to the process. One regenerative process has utilized a recirculating aqueous stream containing alkali metal thiosulfate. Mixtures of alkali metal or ammonium hydroxide and hydrogen sulfide are added to the alkali metal thiosulfate-containing stream prior to charging it to the upstream end of the absorption zone with the absorbed sulfur oxides being produced as alkali metal or ammonium thiosulfates which are withdrawn at least in part and passed to regeneration where sulfur and alkali metal or ammonium hydroxide and alkali metal or ammonium sulfides or hydrogen sulfide are produced for recycle. Some processes of this type are shown in U.S. Pat. No. 3,906,080, issued Sept. 16, 1975 to Everett Gorin et al.; U.S. Pat. No. 3,937,787, issued Feb. 10, 1976 to Everett Gorin et al.; and U.S. Pat. No. 4,008,310, issued Feb. 15, 1977 to Everett Gorin. These patents are hereby incorporated by reference. Such processes by and large have used alkali metal as the cation since ammonia as a cation presents problems with respect to its volatility. It is undesirable that ammonia be emitted into the atmosphere since, as is well known, it has a strong odor and results in pluming from the stack and the like.

As a result of the intense interest in removing sulfur oxides economically from stack gas mixtures, a continuing search has been directed to the development of effective economical regenerable processes.

It has now been found that sulfur oxides are effectively removed from gaseous mixtures containing such oxides by a method comprising (a) contacting the gaseous mixture in a first zone with an aqueous solution containing $(NH_4)_2S_2O_3$ at a pH below about 5.8 to produce at least one compound selected from the group consisting of $(NH_4)_2S_3O_6$ and $H_2S_3O_6$; (b) contacting said gaseous mixture in a second zone with an aqueous solution containing at least one compound selected from the group consisting of ammonia and ammonium thiosulfate at a pH from about 5.5 to about 8.0 to produce at least one compound selected from the group consisting of $(NH_4)_2SO_3$ and $(NH_4)HSO_3$ and remove sulfur oxides from said gaseous mixture; (c) contacting said gaseous stream in a third zone with an aqueous stream containing at least one compound selected from the group consisting of $(NH_4)_2S_2O_3$, $(NH_4)_2S_3O_6$ and $H_2S_3O_6$ at a pH below about 5.5 to recover $NH_3$ from said gaseous stream; (d) withdrawing a stream of said aqueous solution containing at least one compound selected from the group consisting of $(NH_4)_2S_2O_3$, $(NH_4)_2S_3O_6$ and $H_2S_3O_6$ from said first zone; (e) passing at least a portion of said stream from said first zone to said third zone; (f) passing at least a portion of said stream from said first zone to sulfur recovery; (g) withdrawing at least a portion of said aqueous solution containing at least one compound selected from the group consisting of $(NH_4)_2SO_3$ and $(NH_4)HSO_3$ from a lower portion of said second zone; (h) adding $NH_3$ and at least one sulfide compound selected from the group consisting of $(NH_4)_2S$, $(NH_4)HS$, ammonium polysulfide and $H_2S$ to said portion of said aqueous solution withdrawn from said lower portion of said second zone to produce said aqueous solution containing at least one compound selected from the group consisting of ammonia and ammonium thiosulfate; and (i) passing said aqueous solution containing at least one compound selected from the group consisting of ammonia and ammonium thiosulfate to an upper portion of said second zone.

The drawing is a schematic diagram of a process embodying the method of the present invention.

In the FIGURE, a desulfurizer column 10 having a gas inlet 12 and a desulfurized gas outlet 14 is shown. Column 10 comprises a first zone 16, a second zone 18, and a third zone 20 with means positioned therebetween for controlling flow between the zones. Such means are well-known to those skilled in the art and will not be described in detail since a variety of such separation means could be used such as bubble plates, weirs or the like. The gaseous mixture flowing through line 12 is contacted in first zone 16 with an aqueous solution which contains ammonium thiosulfate $(NH_4)_2S_2O_3$ to produce at least one compound selected from the group consisting of ammonium thionate, $(NH_4)_2S_3O_6$, and thionic acid, $H_2S_3O_6$. The aqueous solution of ammonium thionate and thionic acid which may also contain quantities of unreacted ammonium thiosulfate as well as some ammonium bisulfite and the like, is withdrawn from a lower portion of zone 16 and passed via a line 24 and a pump 26 to a splitter valve 28 where a portion of the stream is directed through a line 30 to a reaction vessel 34 with a second portion of the stream being directed through a line 32 to a reactor 46. The stream passing to reactor 34 is retained in reactor 34 for a sufficient period of time for the ammonium bisulfite and the like to react to ammonium thionate, thionic acid, or ammonium thiosulfate prior to passing the solution through a line 36 to an upper portion of third zone 20. The solution passed through line 36 to third zone 20 is injected substantially uniformly across the diameter of column 10 and flows downwardly through zone 20. The gaseous mixture flows upwardly through first zone 16, second zone 18 and third zone 20 and in all zones flows countercurrently to the downwardly flowing liquid which flows from third zone 20 through second zone 18 and then through first zone 16. A stream containing ammonium bisulfite, $(NH_4)HSO_3$, ammonium sulfite $(NH_4)_2SO_3$, ammonium thiosulfate $(NH_4)_2S_2O_3$ and possibly minor amounts of ammonium thionoate $(NH_4)_2S_3O_6$ is recovered from a lower portion 38 of zone 18 through a line 40 and pumped through line 40 by a pump 42 back to an upper portion 39 of second zone 18. A mixture of ammonia and sulfides is added to the mixture flowing through line 40 via a line 58 as will be described more particularly hereinafter. The primary sulfur oxide absorption zone is second zone 18 with third zone 20 absorbing primarily ammonia and first zone 16 absorbing limited quantities of sulfur oxides to form ammonium thionate and thionic acid. A portion of the stream in line 24 is passed through line 32 into reactor 46 where it is contacted with hydrogen sulfide supplied via a line 48 at a reaction temperature from about 90° to about 260° C. (preferably from about 135° to about 180° C.) at a pressure sufficient to maintain the water as a liquid to produce ammonium polysulfide $(NH_4)S \cdot S_4$ which is passed through a line 50 to a reactor 52 wherein the ammonium polysulfide is thermally decomposed at a temperature greater than about 120° C. but preferably below about 150° C. to produce molten sulfur, which is recovered through a line 54 in a relatively pure form, ammonia and hydrogen sulfide. The sulfur is conveniently separated from the water by liquid separation. Water is recovered from reactor 52 through a line 56 and passed to an ammonium sulfate recovery zone 60 where the ammonium sulfate present in the aqueous stream in line 56 is removed via a line 62 with the water being recovered via a line 64 and passed to line 58 for recycle through line 40. Zone 60 may be any suitable $(NH_4)_2SO_4$ recovery process known to those skilled in the art, such as for instance a calcium carbonate bed for reaction with the $(NH_4)_2SO_4$ to produce $(NH_4)_2CO_3$ which is suitable for recycle to line 40. Ammonia and hydrogen sulfide are recovered from reactor 52 via a line 58 and passed through line 58 to line 40. The particular process chosen to regenerate the sulfur-absorbent solution is not considered to form a part of the present invention and a variety of techniques could be used. The method set forth herein, however, is considered to be the preferred embodiment and in a co-pending application entitled "Method for Producing Ammonia and Hydrogen Sulfide", filed on even date herewith by Metro D. Kulik, a method is set forth wherein the ammonia/hydrogen sulfide mixture produced in reactor 52 is produced at a controlled ratio such that the molar ratio $NH_3/H_2S$ is equal to about 2.9 to about 3.2. Such is particularly desirable since desirably the mol ratio of ammonia to hydrogen sulfide recycled to line 40 through line 58 is about 3.0. While some variation in this value is to expected within process limitations, it is highly desirable that the ammonia and hydrogen sulfide be produced in the ratio desired in the recycle stream. Such control is accomplished by adjusting the composition of the stream charged to reactor 46 to from about 25 to about 35 weight percent $(NH_4)_2S_2O_3$ and contacting the stream with $H_2S$ at a temperature from about 285° to about 310° F. at a pressure greater than 100 p.s.i.g. to produce said ammonium polysulfide which is thereafter decomposed in reactor 52 to produce a gaseous mixture wherein $H_2S$ and $NH_3$ are present in a molar ratio $NH_3/H_2S$ from about 2.8 to about 3.2. In a further variation of the sulfur recovery section, a hydrogen sulfide/ammonia separator could be used in line 58. Optionally, additional quantities of hydrogen sulfide or ammonia could be added or removed from the stream in line 58 to obtain a desired $NH_3/H_2S$ ratio. A portion of the sulfur produced and recovered through line 54 may be used to produce additional quantities of hydrogen sulfide.

In first zone 16, the pH is desirably less than about 5.5 with the pH decreasing to a minimum at the lower portion of zone 16. At the lower pH values, $SO_2$ is absorbed by reactions such as:

$$4SO_2 + (NH_4)_2S_2O_3 + H_2O \rightarrow (NH_4)_2S_3O_6 + H_2S_3O_6 \quad (1)$$

The aqueous stream containing the ammonium thionate and thionic acid so produced is a suitable absorbent for ammonia which cannot be permitted to escape with the desulfurized gas exiting third zone 20 through line 14. A portion of this aqueous stream is recycled via line 36 to third zone 20 wherein ammonia is absorbed by reactions such as:

$$H_2S_3O_6 + 2NH_3 \rightarrow (NH_4)_2S_3O_6 \quad (2)$$

The pH in third zone 20 is below about 5.5 and desirably increases to at least 5.5 as the aqueous stream flows toward second zone 18. Suitably, the pH in second zone 18 is from about 5.5 to about 8.0, and preferably is from about 6.0 to about 7.0. The pH of the aqueous stream flowing through second zone 18 decreases as the aqueous stream flows through second zone 18 toward first zone 16. Under such reaction conditions, the absorption of sulfur oxides is greatly favored and sulfur oxides are absorbed by reactions such as:

$$4SO_2 + 6NH_4OH \rightarrow 2NH_4HSO_3 + 2(NH_4)_2SO_3 + 2H_2O \quad (3)$$

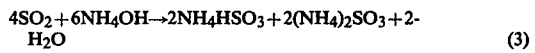

The primary function of the sulfide compounds added to line 40 is to convert the ammonium sulfite $(NH_4)_2SO_3$ and ammonium bisulfite $(NH_4)HSO_3$ into ammonium thiosulfate by reactions such as:

$$2NH_4HSO_3 + 2(NH_4)_2SO_3 + 2NH_4SH \rightarrow 3(NH_4)_2S_2O_3 + 2NH_4OH + H_2O \quad (4)$$

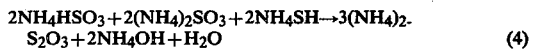

In both first zone 16 and second zone 18, sulfur oxides are absorbed. In first zone 16, the absorption is less efficient since sulfur oxides are less readily absorbed at the extremely low pH values, although it is desirable that the low pH values be maintained in first zone 16 so that the ammonium thionate and thionic acid are produced for use in absorbing ammonia in third zone 20. The aqueous stream recovered from second zone 18 via line 40 contains substantial quantities of ammonium sulfite and ammonium bisulfite which are converted in the main to ammonium thiosulfate by the injection of ammonia and hydrogen sulfide through line 58. This reaction is extremely fast and is substantially complete by the time the aqueous stream is injected into upper portion 39 of second zone 18 via line 40 and normally a slight excess of ammonia is provided in the aqueous stream so injected. Desirably, no unreacted sulfides are present in the stream as injected into second zone 18. This stream is the primary sulfur oxide absorption stream and, in some variations of the invention, could be recovered from line 40 and passed to sulfur recovery although, in most instances, it is preferred that the bulk of the stream passed to sulfur recovery be recovered via line 24 and passed either to sulfur recovery or recycled via line 36. The stream recycled through line 36 is normally a relatively low volume stream by comparison to the stream recycled through line 40 with the relative proportions being determined by the amount of ammonia to be recovered in third zone 20. By-pass lines etc. can be used if necessary to regulate the flow rates to and from each of zones 16, 18 and 20 as known to those skilled in the art. The amount of ammonium hydroxide in line 40 may need to be adjusted beyond that normally required in order to raise the pH of the aqueous stream at the top of second zone 18 to a value in excess of 5.5. Desirably, this pH is as high as 8.0 although it declines to a lower value as the stream passes downwardly through the column absorbing $SO_2$. The pH is suitably from about 5.5 to about 8.0 although it is desirable that the pH be from about 6.0 to about 7.0 with the higher values being preferred.

The stream recovered from first zone 16 via line 24 may contain small quantities of ammonium bisulfite, ammonium sulfite or the like which has not yet reacted to produce ammonium thiosulfate or ammonium thionate. Accordingly, it may be desirable in some instances to provide a reaction zone 34 where a residence time of up to 5 minutes can be obtained to permit the complete reaction of the ammonium bisulfite or the like to other products such as ammonium thionate or ammonium thiosulfate. It is important that substantially all the ammonium bisulfite or ammonium sulfite be reacted before the stream passing through line 36 is injected into third zone 20 since neither of these compounds is stable at the conditions prevailing in third zone 20 and both will emit $SO_2$ into the atmosphere. It is therefore desirable that additional reaction time be provided to insure that substantially all the sulfite compounds have reacted to produce ammonium thiosulfate or ammonium thionate.

Both ammonium thiosulfite and ammonium thionate are stable at the conditions in third zone 20 and do not release either $NH_3$ or $SO_2$. Sulfuric acid has been proposed in the past for such $NH_3$ absorption, but the sulfuric acid is not readily regenerable by reduction to produce sulfur whereas both ammonium thiosulfate and ammonium thionate are readily reduced to sulfur as discussed above.

The reaction temperature in column 10 is desirably below 180° F. Operating temperatures as low as ambient are suitable although it is generally considered uneconomical to cool stack gases to this extent. Typically, the operating temperature will be from about 120° to about 150° F. and preferably the temperature is from about 130° to about 145° F.

As indicated previously, it is desirable that the gas flowing through column 10 flow countercurrently to the liquid in each of zones 16, 18, and 20. While reference has been had to the injection of hydrogen sulfide and ammonia through line 58, it should be clearly understood that this stream will comprise not only hydrogen sulfide and ammonia, but typically ammonium hydroxide, ammonium sulfide, ammonium bisulfide, ammonium polysulfide and the like. Further, it is noted that, while certain of the streams have been referred to by reference to their major component, many other components may also be present. For instance, in line 36, the constituents of interest are ammonium thionate and thionic acid, although it is very likely that substantial quantities of ammonium thiosulfate will be present. Similarly, in line 40 a variety of sulfur compounds may be present with the compounds discussed, although such compounds have not been found to adversely affect the effective performance of such mixtures in absorbing sulfur oxides. The stream flowing downwardly through first zone 16 also may contain a variety of constituents in addition to the ammonium thiosulfate, ammonium sulfite and ammonium bisulfite. As indicated, various other sulfur compounds may also be present in this stream. Such is not particularly detrimental so long as sufficient reaction time is provided in vessel 34. The presence of other sulfur compounds in the stream recovered through line 24 does not adversely affect the sulfur recovery steps in vessels 46 and 52.

While reference has been had to sulfur oxides in the gaseous mixture passed to column 10, it will be recognized by those skilled in the art that the primary sulfur oxides to be considered are sulfur dioxide and sulfur trioxide. Other sulfur oxides will either be oxidized to sulfur dioxide or trioxide or can be considered to react chemically in the same fashion.

The method of the present invention accomplishes the use of ammonia compounds which permit ready regeneration by the technique set forth while preventing the escape of ammonia with the desulfurized gas.

While the invention has been described above with respect to certain of its preferred embodiments, it is respectfully pointed out that many variations and modifications are possible within the scope of the present invention and it is anticipated that many such variations and modifications may appear obvious or desirable to those skilled in the art based upon a review of the foregoing description of preferred embodiments.

Having thus described the invention, we claim:

1. A method for removing sulfur oxides from a gaseous mixture, said method comprising:

(a) contacting said gaseous mixture in a first zone with an aqueous solution containing $(NH_4)_2S_2O_3$ at a pH below about 5.5 to produce at least one compound selected from the group consisting of $(NH_4)_2S_3O_6$ and $H_2S_3O_6$;

(b) contacting said gaseous mixture in a second zone with an aqueous solution containing at least one compound selected from the group consisting of ammonia and ammonium thiosulfate at a pH from about 5.5 to about 8.0 to produce at least one compound selected from the group consisting of $(NH_4)_2SO_3$ and $(NH_4)HSO_3$ and remove sulfur oxides from said gaseous mixture;

(c) contacting said gaseous stream in a third zone with an aqueous stream containing at least one compound selected from the group consisting of $(NH_4)_2S_2O_3$, $(NH_4)_2S_3O_6$ and $H_2S_3O_6$ at a pH below about 5.5 to recover $NH_3$ from said gaseous stream;

(d) withdrawing a stream of said aqueous solution containing at least one compound selected from the group consisting of $(NH_4)_2S_2O_3$, $(NH_4)_2S_3O_6$ and $H_2S_3O_6$ from said first zone;

(e) passing at least a portion of said stream from said first zone to said third zone;

(f) passing at least a portion of said stream from said first zone to sulfur recovery;

(g) withdrawing at least a portion of said aqueous solution containing at least one compound selected from the group consisting of $(NH_4)_2SO_3$ and $(NH_4)HSO_3$ from a lower portion of said second zone;

(h) adding $NH_3$ and at least one sulfide compound selected from the group consisting of $(NH_4)_2S$, $(NH_4)HS$, ammonium polysulfide, and $H_2S$ to said portion of said aqueous solution withdrawn from said second zone to produce said aqueous solution containing at least one compound selected from the group consisting of ammonia and ammonium thiosulfate;
(i) passing said aqueous solution containing at least one compound selected from the group consisting of ammonia and ammonium thiosulfate to an upper portion of said second zone.

2. The method of claim 1 wherein said gaseous mixture flows sequentially through said first zone, said second zone and said third zone and is countercurrently contacted with said aqueous solution containing $(NH_4)_2S_2O_3$ in said first zone, with said aqueous solution containing at least one compound selected from the group consisting of ammonia and ammonium thiosulfate, in said second zone with said aqueous stream containing at least one compound selected from the group consisting of $(NH_4)_2S_2O_3$, $(NH_4)_2S_3O_6$ and $H_2S_3O_6$ in said third zone.

3. The method of claim 2 wherein the pH of said aqueous stream withdrawn from said first zone is less than about 5.5.

4. The method of claim 2 wherein said aqueous stream containing at least one compound selected from the group consisting of ammonia and ammonium thiosulfate, has a pH from about 6.0 to about 7.0.

5. The method of claim 2 wherein the temperature in said first zone, said second zone and said third zone is less than about 180° F.

6. The method of claim 5 wherein said temperature is from about 120° to about 150° F.

7. The method of claim 2 wherein said aqueous stream passed from said first zone to said third zone is passed through a reaction zone to provide a reaction time of at least 5 minutes between the withdrawal of said aqueous stream from said first zone and the introduction of said aqueous stream into said third zone.

8. The method of claim 2 wherein $NH_3$ and said sulfide compound are added to said aqueous stream withdrawn from said second zone in a mol ratio $NH_3/H_2S$ (or $H_2S$ equivalent) of about 2.9 to about 3.2 prior to passing said aqueous solution to said upper portion of said second zone.

* * * * *